United States Patent [19]
Hueske et al.

[11] Patent Number: 5,293,577
[45] Date of Patent: Mar. 8, 1994

[54] METHOD AND APPARATUS FOR PREVENTING INADMISSIBLE DEVIATIONS FROM THE RUNTIME PROTOCOL OF AN APPLICATION IN A DATA EXCHANGE SYSTEM

[75] Inventors: Thomas Hueske; Hildegard Jost, both of Munich; Klaus Mueller, Ottobrunn; Axel Pfau, Munich, all of Fed. Rep. of Germany

[73] Assignee: Siemens Nixdorf Informationssysteme AG, Fed. Rep. of Germany

[21] Appl. No.: 731,257

[22] Filed: Jul. 17, 1991

[30] Foreign Application Priority Data

Jul. 20, 1990 [EP] European Pat. Off. ........ 90113990.7

[51] Int. Cl.$^5$ .............................................. H04L 9/00
[52] U.S. Cl. ..................................................... 380/25
[58] Field of Search ............... 395/800, 650, 325, 425; 380/23, 24, 25, 46; 364/240.8, 240.9

[56] References Cited

U.S. PATENT DOCUMENTS

| | | | |
|---|---|---|---|
| 4,816,654 | 11/1987 | Anderl et al. | |
| 4,974,193 | 11/1990 | Beutelspacher et al. | 395/800 |
| 4,985,921 | 1/1991 | Schwartz | 380/24 |
| 5,045,849 | 9/1991 | Willhaus | 340/825.34 |
| 5,048,085 | 9/1991 | Abraham et al. | 380/23 |
| 5,073,852 | 12/1991 | Siegel et al. | 395/700 |
| 5,093,862 | 3/1992 | Sewartz | 380/25 |
| 5,148,481 | 9/1992 | Abraham et al. | 380/46 |

FOREIGN PATENT DOCUMENTS

0159651A3 10/1985 European Pat. Off.
0190733A2 8/1986 European Pat. Off.
3736190A1 5/1988 Fed. Rep. of Germany.

OTHER PUBLICATIONS

Chiopkarten-klein im Format, gross in der Leistung, Dietrich Kruse Telcom Report 11, 1988, No. 6, pp. 226–228.

Handbuch der modernen Datenverarbeitung, Einsatzmoeglichkeiten der Chipkarte, No. 136, Jul. 1987, Forkel Verlag, pp. 114–123.

*Primary Examiner*—Thomas M. Heckler
*Attorney, Agent, or Firm*—Hill, Steadman & Simpson

[57] ABSTRACT

Method and apparatus for preventing inadmissible deviations from the runtime protocol of an application in a data exchange system. The data exchange system has, for example, a terminal T and a chip card K. For various applications (for example, automatic teller unit, computer access), basic functions B stored in the chip card K are processed in a sequence respectively defined in a protocol. Since the basic functions B are called in proceeding from the terminal T, the data integrity could be deteriorated by intentional modifications of the protocol sequence at the terminal T. By storing the allowable protocols in a control list STL and establishing a status memory area ZS on the chip card K, it becomes possible to monitor the protocol execution on the chip card K independently of the terminal T. The respective status Z of an application is fixed in the status memory area ZS. All basic function designations Bn permitted for a status Z are deposited in the control list STL.

32 Claims, 2 Drawing Sheets

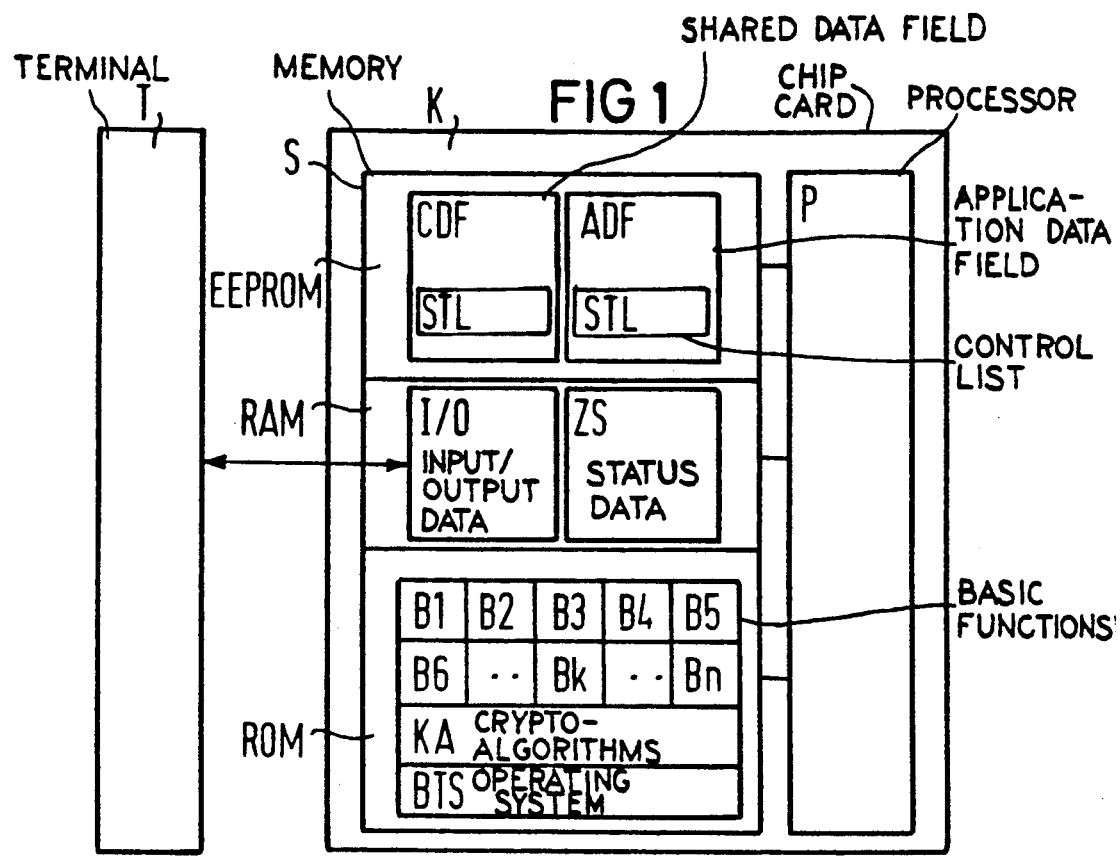
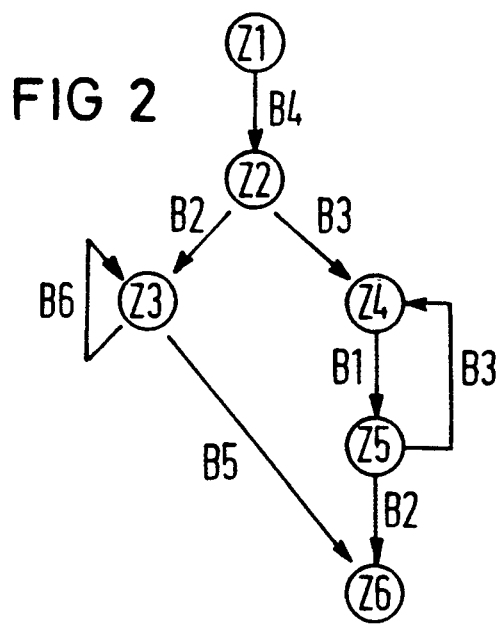

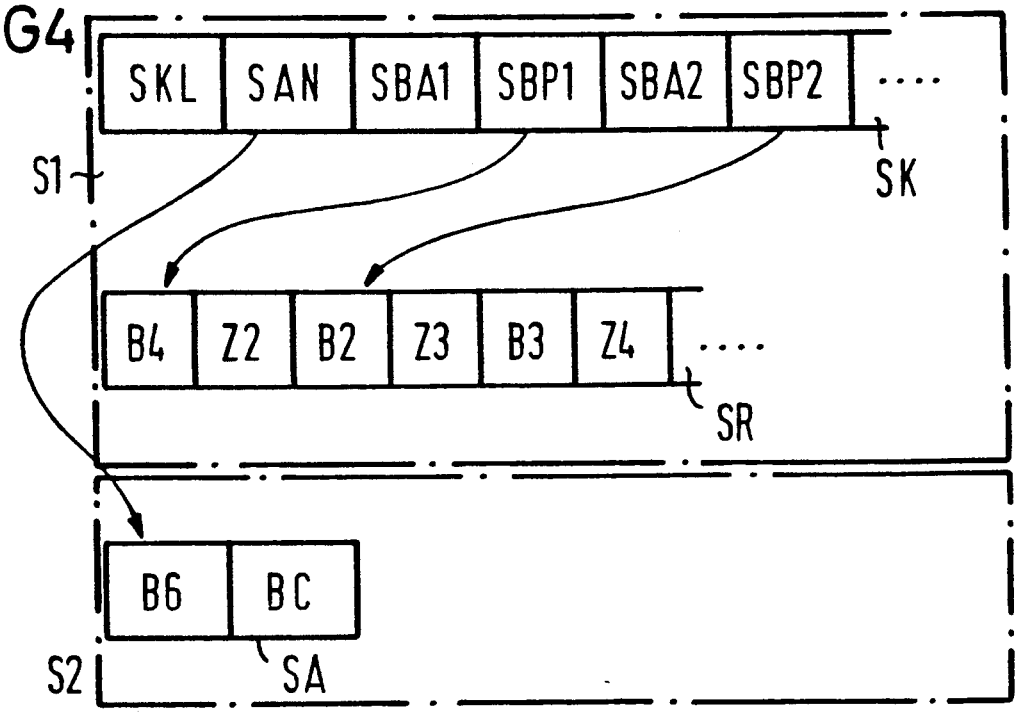

METHOD AND APPARATUS FOR PREVENTING INADMISSIBLE DEVIATIONS FROM THE RUNTIME PROTOCOL OF AN APPLICATION IN A DATA EXCHANGE SYSTEM

BACKGROUND OF THE INVENTION

Portable data carriers are devices that utilize magnetic, optical or other physical mediums for storing information. When intelligence in the form of a microprocessor is allocated to these data carriers, the data carriers become very versatile and satisfy the strictest demands for data integrity. Intelligent data carriers are used to a great extent in the form of chip cards.

The chip card can be used, for example, as a cash-free means of payment, as a personal or a security identification, as a key for access to computers and as a means for all other applications wherein unambiguous identification of a user is necessary or the authorization of a user to execute a specific application must be established. When a single chip card can be used for a plurality of such applications, such a chip card is termed a multifunctional chip card. Due to its physical structure (in addition to a processor, a mask-programmable ROM memory area, a fast RAM memory area acting as a working memory and a non-volatile, programmable memory area, such as an EEPROM memory area that are accommodated on the chip) the chip card can be programmed for many applications by the card issuer on the basis of an appropriate programming of the EEPROM memory area. In every application, some of the basic functions deposited in the ROM memory area must be executed according to a given protocol.

The ROM memory area stores a plurality of basic functions, such basic functions can be for example, a PIN check and a conclusion of a particular application. Numerous other basic functions are known in the prior art such as terminal authenticity checks and balancing of financial transactions. See, for example, prior art European reference 0,190,733.

An application data field is provided in the EEPROM memory area for every application. A basic function can only access data entered in such a field when this application was previously called in. Data having different access conditions can be deposited in the application data field. For example, it can be defined that data can only be read or modified when the chip card user identifies himself with a PIN number (personal identification number).

The information regarding what application is present, what basic function is to be processed and the information required for an authorization check are received by the chip card by means of a data exchange with a terminal. The chip card is directly connected to this terminal by electrical contacts or is indirectly connected via optical or inductive coupling devices. Thus, from the terminal, basic functions can be called in to be processed on the chip card. The sequence wherein these basic functions are called in is consequently determined by the terminal. Since it is necessary to process the basic functions in a defined sequence for reasons of security technology, there is a certain security risk due to a possible manipulation at the terminal by which the operational sequence could be modified or certain basic functions could be omitted.

SUMMARY OF THE INVENTION

In a data exchange system of the type initially cited, an object of the present invention is to eliminate the security risk of changes in a runtime protocol of an application as a result of unauthorized or incorrect manipulation at the terminal. Such changes in the runtime protocol are hereinafter referred to as inadmissible deviations.

This object is inventively achieved by the method of the present invention for preventing inadmissible deviations from the runtime protocol of an application in a data exchange system having at least one terminal and at least one portable data carrier, the at least one portable data carrier having at least one processor and at least one memory for executing at least one application. The method comprises the steps of: for data exchange, the data carrier is connected to the terminal, as a result whereof a status memory area present in the memory of the data carrier is placed into a basic status; the terminal communicates an application command to the data carrier, the command indicating an application allocated to the terminal; the terminal communicates a function command to the data carrier, the function command containing at least one basic function designation of a basic function that is to be executed next; this basic function designation is compared in the data carrier to basic function designations stored in the memory of the data carrier with reference to the previously identified application, the basic function designations being allowable in the existing protocol status fixed by an entry in the status memory area; the basic function allocated to the basic function designation communicated to the data carrier is executed in the data carrier only given a positive comparison result; after the successful execution of the basic function, the data deposited in the status memory area is adapted to the new protocol status, and an acknowledge signal is transmitted from the data carrier to the terminal; and until the execution of the application is ended or aborted, the next basic function to be executed is called in by the terminal after the transmission of an acknowledge signal from the data carrier to the terminal, being called in by communicating a function command to the data carrier.

The security of the data exchange system is additionally enhanced by storing the admissible protocol sequences on the data carrier itself and by the inventive utilization of this storing in interaction with a status memory area. The data carrier itself can recognize manipulations at the terminal and initiate suitable countermeasures. Moreover, the method of the present invention can be utilized for arbitrary applications.

Particular developments and improvements of the method of the present invention and an apparatus for the implementation of the method will now be described in general terms. Referring now to the general description of the method of the present invention set forth above, a partial initialization of the status memory area can be initiated by the communication of the application command from the terminal to the data carrier. The communication of the application command from the terminal to the data carrier can effect the entry of a block number in the status memory area. This block number indicates the location in the memory of the data carrier at which the basic function designations permitted in the respectively existing protocol status for the application indicated with the application command, are deposited. The transmission of information from the terminal to the data carrier can only occur when an acknowledge signal was previously communicated from the data carrier to the terminal.

A further application can be called in by communicating an application command from the terminal to the data carrier only after the conclusion or abort of a previously activated application.

At least the content of the status memory area is deposited in an auxiliary memory given communication of an application command before the conclusion of an application. Subsequently, the partial initialization of the status memory area occurs and the inserted application identified with the application command is processed after initialization has occurred. After the conclusion of the inserted application, the data deposited in the auxiliary memory and allocated to the interrupted application are transferred back to their original memory locations. The execution of the interrupted application is then continued.

Basic function input parameters are contained in the function command in addition to the basic function designation and are communicated to the data carrier. A check to determine whether a block number that is entered in the status memory area is carried out after the receipt of a function command. A first memory area of the memory is checked to determine whether an entry for the existing protocol status of the application identified with the application command is present in this first memory area. In case of an existing entry for the existing protocol status, the basic function designations stored with respect to this protocol status in the first memory area are compared to the function designation communicated to the data carrier with the function command. In the case of a missing entry for the existing protocol status or, of a non-coincidence of the communicated and of the stored basic function designations in the first memory area, a check is carried out in a second memory area of the memory to determine whether the basic function designation communicated to the data carrier is entered in this second memory area with respect to the application designated with the application command, regardless of the existing protocol status. In addition for the case of a missing entry for the existing protocol status or, respectively, of a non-coincidence of the communicated and of the stored basic function designation, a check is carried out both in the first memory area as well as in the second memory area to determine whether the communicated basic function designation is the basic function designation for the concluding basic function.

After the successful execution of a basic function, the designation of this basic function is entered in a basic function memory location of the status memory area. Given non-coincidence of the basic function designation communicated to the data carrier with the corresponding entries in the memory, this communicated basic function designation is compared to the designation of the most recently successfully executed basic function that is noted in the basic function memory location of the status memory area.

Rights of access to data in the data carrier that are potentially required for a basic function execution and that are deposited in the status memory area are checked. A successor status designation deposited in the first memory area in conjunction with a stored basic function designation is entered in the protocol status memory location of the status memory area after the successful execution of this basic function allocated to the stored basic function designation. After a successful basic function execution, information regarding the runtime execution and/or regarding the data access monitoring are entered in the status memory area for adaptation to the new protocol status. The information for data access monitoring are entered in the status memory area separately according to the application-related and global data. With regards to the comparison of the basic function designations, a selective error message is communicated from the data carrier to the terminal for a negative comparison result.

An apparatus for the implementation of the method of the present invention has a memory divided into a data memory (EEPROM) containing shared and application-related data, a working memory (RAM) that also services an input/output interface and a mask memory (ROM) containing an operating system and a plurality of basic functions. The data memory (EEPROM) contains a control list for every possible application, the control list containing the allowable runtime protocols. The status memory that accepts the respective protocol statuses is contained in the working memory (RAM). The control list is divided into a control list header and into a control list trailer. A control list header length and a data pair that is composed of information indicating the basic function plurality executable given the respective status and of a pointer indicating a memory location in the control list trailer are linearly stored in succession in the control list header for every status possible given the application, beginning with the first status. The control list trailer is composed of at least one group composed of respectively at least one data duple and respectively allocated to a status. The data duples are respectively composed of a stored basic function designation and of a successor status designation. The pointer allocated to a defined status respectively indicates the beginning of a group in the control list trailer allocated to the same status. A list of exceptions is allocated to a control list. An exception list block number that directly or indirectly indicates the memory location at which the list of exceptions is stored is entered in the control list header immediately following the control list header length. The basic function designations of the basic functions that can be implemented at any time regardless of the existing protocol status are successively indicated in the list of exceptions.

In the apparatus, memory locations for defined information related to the protocol execution and/or related to the data access monitoring are present in the status memory area. A respective memory location for the block number of the control list allocated to the existing application, for a basic function memory location for the basic function designation of the most recently successfully executed basic function and for a protocol status memory location for the protocol status after the most recently successfully executed basic function is present in the status memory area for the protocol execution. The memory locations present in the status memory area for data access monitoring are divided into global memory locations and into application-related memory locations.

A respective memory location is provided for the application-related storing of an executed PIN check, for some authenticity checks executed differently from one another. A global memory location is provided for storing an implemented PIN check.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 depicts a data exchange means for the implementation of the method of the present invention;

FIG. 2 is a flowchart of an application;

FIG. 3 is a successor table for the flowchart;

FIG. 4 depicts excerpts from a control list related to the flowchart; and

FIG. 5 depicts a status memory area of the data carrier.

DESCRIPTION OF THE PREFERRED EMBODIMENT

FIG. depicts a data exchange system composed of a data carrier preferably fashioned as a chip card K and of a terminal T. The terminal T is a data input/output means of a data processing system equipped with an interface for data exchange with the chip card K, for example an automatic teller, a statement printer, a personal identification means or a correspondingly equipped telephone apparatus.

Other data carriers that deviate more or less from the geometrical shape of the chip card K depicted in FIG. 1 are also useable with the present invention. The only critical factor is that the data carrier contains a processor P and a memory S. In the exemplary embodiment, the chip card K and the terminal T are releasably connected to one another via electrical contacts.

The memory S of the chip card K is divided into three areas that differ from one another in terms of memory technology; an electrically erasable programmable read-only memory EEPROM, a fast programmable and readable random access memory RAM used as working memory and a mask-programmable read-only memory area ROM. The three memory areas are utilized differently according to their memory properties. The user-independent, universally employable data and programs are stored in the mask-programmable memory area ROM by the card manufacturer. Among other things, a plurality of basic functions B1 . . . Bn, crypto-algorithms KA, for example for encoding the data in the data exchange, and an operating system BTS of the chip card K are entered in this mask-programmable memory area ROM.

Data that is required for the duration of a connection between the terminal T and the chip card K is deposited in the programmable and readable memory area RAM. Included in such data are the input/output data, I/O, and data that is deposited in a status memory area ZS. The data defined by the card issuer is stored in the electrically programmable and erasable memory area EEPROM. This memory area EEPROM contains data deposited in what is referred to as a shared data field CDF that can be employed independently of a specific application and data that can only be accessed with reference to one application. These application-associated data is deposited in what are referred to as application data fields ADF. The shared data field CDF and the application data fields ADF additionally contain what are referred to as control lists STL in which at least the operational sequence of one application is respectively defined. A control list STL allocated to a defined application data field ADF can also be stored outside of the application data field ADF in the shared data field CDF. This is always meaningful when the same operational sequence is prescribed for different applications. Storage space can be saved since the control lists STL for two or more such applications only have to be stored once.

FIG. 2 shows the flowchart of an application. Proceeding from an initial status Z1, a second status Z2 follows the initial status Z1 due to the processing of a fourth basic function B4. Proceeding from this second status Z2, the processing of two basic functions B2, B3 is alternatively possible. With the successful processing of the second basic function B2, the application proceeds into a third status Z3 and the application proceeds into a fourth status Z4 with the successful processing of the third basic function B3. Proceeding from the fourth status Z4, only the processing of the first basic function B1 is allowed, the application then proceeding into a fifth status Z5 as a result.

Proceeding from this fifth status Z5, the processing of either the second basic function B2 or of the third basic function B3 is allowed; whereas the processing of the third basic function B3 returns to the fourth status Z4 of the application, the processing of the second basic function B2 leads to a final status Z6 of the application. When, proceeding from the second status Z2, the second basic function B2 is processed, the application proceeds into the third status Z3. Proceeding from this status Z3, only the processing of the fifth basic function B5 is allowed and leads to the final status Z6 of the application. At every status Z1–Z6 of the application, the processing of a sixth basic function B6 and of a concluding basic function BC are additionally allowed. Representing all sixth basic functions B6, only the sixth basic function B6 is depicted in FIG. 2 at the third status Z3 of the application. The processing of the sixth basic function B6 always returns to the status from which it proceeded. The processing of the concluding basic function BC always leads to the termination of the application.

FIG. 3 shows a successor table. All statuses Z1–Z6 (referred to in general as Z) possible within the application are entered in the first column with the numbers 1 through 6. The plurality BA of the allowable basic functions, referred to in general as B, is entered in the second column for every status. According to the flowchart of FIG. 2, there are two basic functions B for the first status Z1, three basic functions B for the second status Z2, two basic functions B for the third status Z3, two basic functions B for the fourth status Z4, three basic functions B for the fifth status Z5 and two basic functions B for the sixth status Z6. Since the termination of an application does not result in an application status, the concluding basic function BC that is possible for every status Z is not taken into consideration in the successor table of FIG. 3.

According to the second column, a plurality of column pairs are recited in the table. The number of column pairs corresponds to the maximum number BA of allowable basic functions B that can follow a status Z. Every column pair is composed of a column wherein the number B1–B6 of the respectively allowable basic function B is set forth and of a second column wherein the successor status designation ZF of the status Z1–Z6 following the respective status Z after the processing of a basic function B is entered. In the second status Z2, for example, three basic functions B are thus allowed for processing, namely the second basic function B2, the third basic function B3 and the sixth basic function B6. The second basic function B2 is followed by the third status Z3, the third basic function B3 is followed by the fourth status Z4 and the sixth basic function B6 is followed by the second status Z2.

The successor table of FIG. 3 could in fact be stored in this form. However, this would result in a high outlay for the interpretation of this table. The successor table is therefore stored in the form of a control list STL, as depicted in FIG. 4.

FIG. 4 shows excerpts from a control list STL that is entered in two memory areas S1 and S2. A control list header SK and a control list trailer SR are contained in the memory area S1 and a list of exceptions SA is deposited in the memory area S2. The control list header SK contains a respective memory location for a control list header length SKL and for an exceptions list block number SAN. Further, the control list header SK contains memory location pairs successively allocated to the allowable statuses Z in ascending sequence. The plurality SBA of basic functions B (with the exception of the basic functions B whose basic function designations Bn are entered in a list of exceptions SA) allowed for the associated status Z and a pointer SBP are respectively entered in these memory location pairs. This pointer SBP indicates a memory location in the control list trailer SR where the allowable basic functions B and their successor statuses ZF are deposited. The control list trailer SR is composed of groups of data duples, whereby the pointer SBP from the control list header SK indicates the start of every group. Such a duple is composed of a memory location for the designation of a basic function B and of a memory location for a successor status designation ZF of a status that compulsorily follows the basic function B referenced in the duple.

As FIG. 4 shows, a function plurality SBAI and a pointer SBPI are allocated to the first status Z1 in the control list header SK. The pointer SBPI indicates the group allocated to the first status Z1 in the control list trailer SR that contains a data duple. The designation of the fourth basic function B4 and the successor status designation of the second status Z2 following the successful processing of the fourth basic function B4 are entered in the memory locations of this data duple. These entries correspond to the entries that can be derived from the corresponding location in FIG. 2 or, respectively, FIG. 3.

Since the processing of the sixth basic function B6 and the processing of the concluding basic function BC that terminates the application are allowable at all statuses Z of the application, it is advantageous to not enter these basic functions in the control list trailer SR. Due to the establishment of the list of exceptions SA in the second memory area S2, the designations of the basic functions B6, BC allowable at every status Z can be inserted into a control list STL in a manner that saves storage space. In addition to the control list header length SKL, an exception list block number SAN is entered in the memory location in the control list header SK. The list of exceptions SA is allocated to the application by this number. Due to this type of allocating the list of exceptions and in common with the storing of the list of exceptions SA in the shared data field CDF, it is also possible to use one list of exceptions SA for various applications.

FIG. 5 shows a specific execution of the status memory areas ZS. The status memory ZS contains information about the runtime protocol and about the data access monitoring. The block number STB of the control list STL, the designation of the basic function B that was most recently successfully processed, this being entered in the basic function memory location BZ, and the information about the current protocol status Z that is deposited in the protocol status memory location Zi belong to the information regarding the runtime protocol. The memory locations for the data access monitoring comprise a location APIN for the identification of a successfully implemented PIN check within the application, two memory locations for depositing the information as to whether two different authenticity checks AUGH1, AUTH2 were successfully implemented, a few reserve memory locations RES and a memory location wherein the information as to whether a global PIN check GPIN was successfully implemented is entered.

The execution of the method of the present invention using the above-described apparatus shall be set forth below.

When a chip card K is plugged into the terminal T, an electrical connection is produced between the terminal T and the chip card K by electrical contacts or, potentially, in non-contacting fashion. This connection is effective both with respect to a power supply as well as with respect to the coupling of a input/output devices of the terminal T and of the chip card K. The entire working memory area is reset to a defined condition, for example, all bits are equal to zero when the chip card K is plugged into the terminal T.

In this example, the terminal is allocated to a defined application, for example, an automatic teller unit of a bank. The respective type of application is communicated to the chip card K in such fashion that the terminal T transmits a specific application command to the chip card K. A check is then carried out on the chip card K to determine whether an application data field ADF for this specific application is present on the chip card K. When this application data field ADF is present, a partial initialization of the status memory area ZS occurs. This initialization causes the block number STB of the control list STL allocated to this application and noted in the application data field ADF or in the shared data field CDF to be entered in the status memory area ZS and the protocol status memory location Zi, wherein the current application status Z must be entered, is set to the first status Z1. Further, all bits of the application-related memory locations are reset (for example, zero). The bits of the memory locations for global data remain unaltered.

After the message to the terminal T that the initialization event is concluded, the transmission of a function command from the terminal T to the chip card K occurs, whereby this function command indicates, for example, the fourth basic function B4 and contains the necessary input data for this basic function B4. Due to the entry in the status memory area ZS, the chip card K is in the first status Z1. That data pair that is allocated to the first status Z1 is now read in the control list header SK, the control list STL having the block number STB entered in the status memory area ZS. It is entered in the memory location SBA1 that only one basic function B is allowable in this first status Z1. The pointer SBPI entered next to this memory location indicates the group of data duples allocated to the first status Z1. This duple contains the designation of the fourth basic function B4 and the designation of the status Z2 that follows the fourth basic function B4. The comparison of the basic function designation B4 transmitted from the terminal T and of the basic function B4 that is entered in the data duple of the control list trailer SR provides a positive result. As a result of this positive comparison result, the fourth basic function B4 is processed upon application of the input parameters that are transmitted together with a function command.

Assuming that the fourth basic function B4 is the function responsible for the PIN check and that the PIN number was correctly input at the terminal T before the calling of the function, the fourth basic function B4 supplies the result that the PIN check was successfully undertaken. The designation of the fourth basic function B4 is entered at the basic function memory location BZ for the basic function B of the status memory area ZS that was most recently successfully executed. In addition, the successfully executed PIN check is noted at one of the memory locations APIN or GPIN, for example by setting a bit. Which bit of the two memory locations is set depends on whether a plurality of applications can be realized with the same terminal T and depends on whether the same PIN number is required for all applications for which the chip card K is allowed. Since, in the case under consideration, the terminal T is exclusively allocated to the automatic teller unit and, thus, only one application can be implemented with this terminal T, the memory location APIN in the status memory area ZS is set to 1.

The status Z of the application is thereby promoted into the second status Z2 in that the status Z2 entered in the data duple in the control list trailer SR in the form a defined bit sequence in addition to the basic function designation B4 is entered into the protocol status memory location Zi of the status memory area ZS.

After an acknowledge signal that indicates the successful processing of the fourth basic function B4 to the terminal T has been transmitted from the chip card K to the terminal T, the first transaction is terminated. The chip card K is now again ready to receive information in the form of a function command.

The terminal T now transmits a second function command to the chip card K. This function command indicates the third basic function B3 and contains the input parameter of this basic function B3. The respective data pair that is allocated to the second status Z2 is read in the control list header SK. The number two resides in the memory location SBA2 and indicates the plurality of allowable basic functions B. The appertaining pointer SBP2 indicates the first memory location, the group of data duples in the control list trailer SR allocated to the second status Z2.

The basic function designations B2, B3 entered in this group are compared to the basic function designation B3 that was transmitted to the chip card K together with the function command. The result of the comparison is positive. After a successful processing of the third basic function B3, the status Z of the application of chip card K is placed into the status Z4. Assuming that data deposited in the application data field ADF must be accessed during the course of processing the basic function B3 and that this access is only allowable when a PIN check was previously successfully implemented, the PIN memory locations APIN, GPIN in the status memory area ZS are read before the beginning of the processing of the third basic function B3. The third basic function B3 is processed only when one of the two bits is set to 1. When this processing is ended, the designation of the third basic function B3 is entered in the basic function memory location BZ of the status memory area ZS and the fourth status Z4 is entered in the protocol status memory location Zi. An acknowledge signal is additionally transmitted to the terminal T.

The sixth basic function B6 is requested with the next function command and the necessary input parameters are transmitted to the chip card K. The data pair allocated to the fourth status Z4 is read in the control list header SK. A 1 is entered in the memory location for the function plurality SBA4. The pointer SBP4 indicates the data duple in the control list trailer SR, this data duple being allocated to the fourth status Z4. The basic function designation B1 of the first basic function B and the corresponding, fifth successor status Z5 reside in this data duple. A comparison of the basic function designation B1 in the control list trailer SR to the basic function designation B6 transmitted to the chip card K supplies a negative result. The exception list block number SAN is subsequently read in the control list header SK. The basic function designations B6, BC entered in the list of exceptions SA are now compared to the basic function designation B6 transmitted to the chip card K. The sixth basic function B6 is processed as a result of the positive comparison and given the condition that potential data access conditions are met. Despite a successful processing, the basic function designation B6 of the sixth basic function B is not entered in the basic function memory location BZ of the status memory area ZS. The entry in the protocol status memory location Zi likewise remains unmodified. The transmission of an acknowledge signal to the terminal T also now occurs.

In case, after processing the third basic function B3, the application is in the fourth status Z4 and the terminal T again calls in the third basic function B3, all comparisons in the control list trailer SR and in the list of exceptions SA provide a negative result. A further comparison occurs in this case. The basic function designation B3 of the third basic function B transmitted to the chip card K is compared to the basic function designation B3 entered in the status memory area ZS in the basic function memory location BZ. This comparison provides a positive result and the processing of the third basic function B3 is allowed. A repeatability of basic functions B is thus guaranteed.

The basic functions B of the applications subsequently called in are handled in a corresponding manner until the concluding basic function BC that ends the application is called in by the terminal T. The concluding basic function BC can be called in after the processing of any arbitrary basic function B since the basic function designation BC is contained in the list of exceptions SA. In case no list of exceptions SA exists, the processor P must check to see whether the basic function B called in by the terminal T is the concluding basic function BC after all comparisons have provided negative results. It can be assured in this way that the concluding basic function BC can be called in at any time even when a list of exceptions SA is not present.

When none of the possible comparisons produces a positive result, the terminal T is informed of this result in the form of a selective error message. For example, it proceeds from this selective error message that the reason for the rejection is the inadmissibility of the processing of the basic function B in the existing application status Z. Other selective error messages, for example, can indicate that the PIN number was incorrectly input or that a PIN check has not yet occurred.

It will be adequate in most instances to execute only one application with a terminal T. It is adequate in these cases when a further application can be called in only after the conclusion or abort of a previously activated application. When, however, a plurality of applications are allowed at a terminal T, it can be meaningful to also call in these applications, wherein the applications are nested in one another. It is then possible in these instances, after the communication of an acknowledge signal from the chip card K to the terminal T, to transmit an application command to the chip card K even before the conclusion of an application. When an application command reaches the chip card K before the conclusion of an application, the content of the status memory area SA and an identifier that unambiguously identifies the application currently being processed are deposited in an auxiliary memory. This auxiliary memory, for example, can be established in the shared data field CDF. After such data have been stored in the auxiliary memory, the partial initialization of the status memory area ZS is undertaken. The inserted application identified with the application command can be processed in the manner set forth above. After the conclusion of the inserted application, data of the interrupted application deposited in the auxiliary memory are transferred back to their original memory locations. The execution of the previously interrupted application can then be continued.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for preventing inadmissible deviations from a runtime protocol of an application in a data exchange system having at least one terminal and at least one portable data carrier, the portable data carrier having at least one processor and at least one memory for executing at least one application, comprising the steps of:

for data exchange, with the data carrier being connected to the terminal, placing a status memory area present in the memory of the data carrier into a basic status;

transmitting an application command from the terminal to the data carrier, said application command specifying an application allocated to the terminal;

transmitting a function command from the terminal to the data carrier, the function command containing at least one basic function designation of a basic function that is to be executed next;

comparing in the data carrier the basic function designation to basic function designations stored in the memory of the data carrier with reference to the previously specified application and with reference to an existing protocol status, said existing protocol status being fixed by an entry in the status memory area;

executing in the data carrier the basic function allocated to the basic function designation communicated to the data carrier, only for a positive comparison;

after a successful execution of the basic function, adapting the data deposited in the status memory area to a new protocol status, and transmitting an acknowledge signal from the data carrier to the terminal; and if the application has not terminated by one of ending after execution of the basic function and being aborted during execution of the basic function transmitting a further function command from the terminal to the data carrier.

2. The method according to claim 1, wherein the memory of the data carrier has a first memory area that is checked to determine whether an entry for the existing protocol status of the application identified with the application command is present in the first memory area.

3. The method according to claim 2, wherein, in case of an existing entry for the existing protocol status, the basic function designations stored with respect to this protocol status in the first memory area are compared to the function designation transmitted to the data carrier with the function command.

4. The method according to claim 3, wherein the memory of the data carrier has a second memory area and wherein, in the case of a missing entry for the existing protocol status, and in the case of a non-coincidence of the transmitted and of the stored basic function designations in the first memory area, a check is carried out in the second memory area of the memory to determine whether the basic function designation transmitted to the data carrier is entered in the second memory area with respect to the application designated with the application command, regardless of the existing protocol status.

5. The method according to claim 4, wherein a check is carried out both in the first memory area as well as in the second memory area to determine whether the transmitted basic function designation is the basic function designation for a concluding basic function.

6. The method according to claim 2, wherein the status memory area has a basic function memory location and wherein, after the successful execution of a basic function, the designation of this basic function is entered in the basic function memory location of the status memory area, and wherein given non-coincidence of the basic function designation transmitted to the data carrier with the stored basic function designations in the memory, the transmitted basic function designated is compared to the designation of a most recently successfully executed basic function that is noted in the basic function memory location of the status memory area thereby guaranteeing a repeatability of execution of a basic function.

7. The method according to claim 2, wherein rights of access to respective data in the data carrier required for a basic function execution and deposited in the status memory area are checked, before execution of the basic function in order to determine allowability of access to the respective data by the basic function and wherein a successor status designation deposited in the first memory area in conjunction with a stored basic function designation is entered in the protocol status memory location of the status memory area after the successful execution of the basic function allocated to the stored basic function designation.

8. The method according to claim 1, wherein the transmission of the application command from the terminal to the data carrier effects the entry of a block number in the status memory area; and wherein this block number indicates the location in the memory of the data carrier at which are deposited the basic function designations that are permitted in the respectively existing protocol status given the application indicated with the application command.

9. The method according to claim 8, wherein a check to determine whether a block number has been entered in the status memory area is carried out after the transmission of the function command.

10. The method according to claim 1, wherein at least the content of the status memory area is deposited in an auxiliary memory when a further application command is transmitted from the terminal to the data carrier before termination of execution of a previously activated application; wherein, subsequently, a partial initialization of the status memory area occurs such that only memory locations of the status memory area that are related to the current application are reset; and wherein an inserted application identified with the further application command is processed after initialization has occurred, the current application thereby being interrupted.

11. The method according to claim 10, wherein after termination of execution of the inserted application, the data deposited in the auxiliary memory and allocated to the interrupted application is transferred back to it original memory locations; and wherein the execution of the interrupted application is continued.

12. The method according to claim 1, wherein after a successful basic function execution, information regarding at least one of runtime protocol and data access monitoring is entered in the status memory area for adaptation to a new protocol status.

13. The method according to claim 12, wherein the information for data access monitoring is entered in the status memory area separately according to application-related data and global data.

14. The method according to claim 1, wherein a partial initialization of the status memory area is initiated by the transmission of the application command from the terminal to the data carrier.

15. The method according to claim 1, wherein the transmission of at least a further function command from the terminal of the data carrier only occurs when the acknowledge signal was previously transmitted from the data carrier to the terminal.

16. The method according to claim 1, wherein a further application can be called in by transmitting an application command from the terminal to the data carrier only after termination of execution of a previously activated application.

17. The method according to claim 1, wherein the function command contains basic function input parameters in addition to the basic function designation.

18. The method according to claim 1, wherein the status memory area has a basic function memory location and wherein, after the successful execution of a basic function, the designation of this basic function is entered in the basic function memory location of the status memory area.

19. The method according to claim 1, wherein rights of access to respective data in the data carrier required for a basic function execution and deposited in the status memory area are checked before execution of the basic function in order to determine allowability of access to the respective data by the basic function.

20. The method according to claim 1, wherein a selective error message is transmitted from the data carrier to the terminal given a negative comparison.

21. A portable data carrier for implementation of a method for preventing inadmissable deviations from a runtime protocol of an application in a data exchange system having at least one terminal that interfaces with the portable data carrier, the portable data carrier having at least one application, comprising: a memory divided into a data memory containing shared and application-related data, a working memory that also services an input/output interface and a mask memory containing an operating system and a plurality of basic functions that are executable by the data carrier; the data memory containing a control list for every possible application, said control list containing a list of basic function designations in relation to allowable runtime protocols; and the working memory containing a status memory that accepts respective protocol statuses.

22. The portable data carrier according to claim 21, wherein the control list is divided into a control list header and into a control list trailer.

23. The portable data carrier according to claim 22, wherein a control list header length and a data pair that is composed of an information indicating a basic function plurality executable given a respective status and of a pointer indicating a memory location in the control list trailer are linearly stored in succession in the control list header for every possible status for the application, beginning with a first status.

24. The portable data carrier according to claim 22, wherein the control list trailer is composed of at least one group composed of respectively at least one data duple and respectively allocated to a status; and wherein the at least one data duple is respectively composed of a stored basic function designation and of a successor status designation.

25. The portable data carrier according to claim 22, wherein the pointer allocated to a defined status respectively indicates the beginning of a group in the control list trailer allocated to the same status.

26. The portable data carrier according to claim 21, wherein a list of exceptions is allocated to the control list.

27. The portable data carrier according to claim 26, wherein an exception list block number that indicates the memory location at which the list of exceptions is stored is entered in the control list header immediately following the control list header length.

28. The portable data carrier according to claim 26, wherein the basic function designations of the basic functions that can be implemented at any time regardless of the existing protocol status are successively indicated in the list of exceptions.

29. The portable data carrier according to claim 21, wherein memory locations for defined information related to the at least one of protocol execution and data access monitoring are present in the status memory area.

30. The portable data carrier according to claim 29, wherein the status memory area has for the protocol execution a respective memory location for the block number of the control list allocated to the existing application, a basic function memory location for the basic function designation of the most recently successfully executed basic function and a protocol status memory location for the protocol status after the most recently successfully executed basic function.

31. The portable data carrier according to claim 29, wherein the memory locations present in the status memory areas for data access monitoring are divided into global memory locations and into application-related memory locations.

32. The portable data carrier according to claim 31, wherein the status memory area has a respective memory location for the application-related storing of an executed PIN check, for at least two authenticity checks executed differently from one another and has a global memory location for storing an implemented PIN check.

* * * * *